April 22, 1947. A. A. PINTO 2,419,501
DEBRIS ACCUMULATING AND SEPARATING TRAP FOR DRAIN PIPES
Filed Jan. 2, 1945
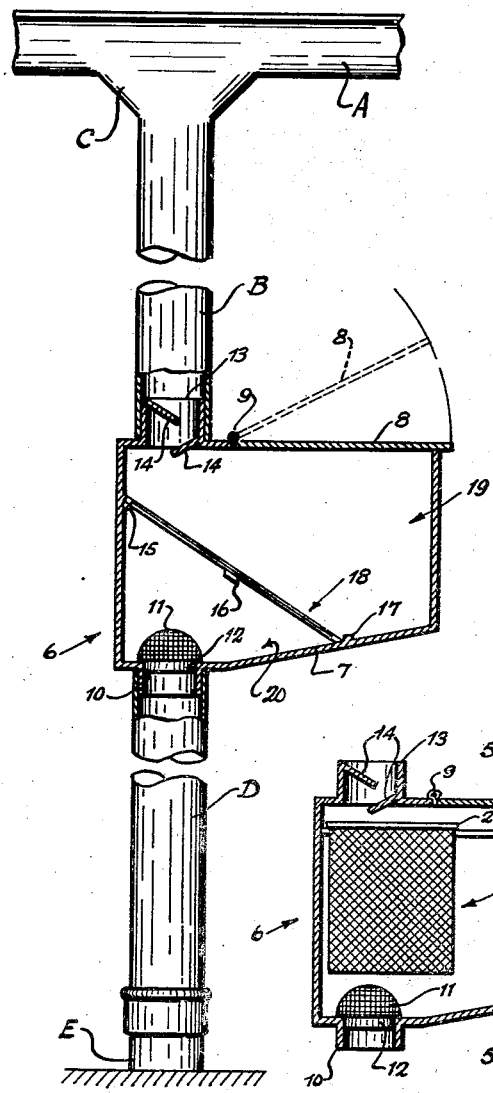
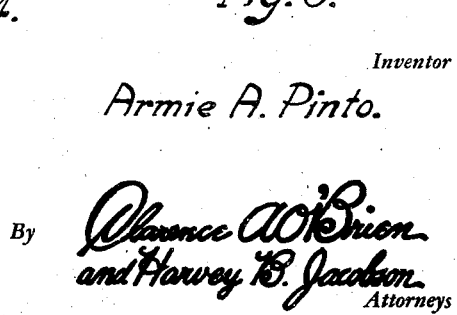
Inventor
Armie A. Pinto.

Patented Apr. 22, 1947

2,419,501

UNITED STATES PATENT OFFICE 2,419,501

DEBRIS ACCUMULATING AND SEPARATING TRAP FOR DRAIN PIPES

Armie A. Pinto, Highland Park, Mich.

Application January 2, 1945, Serial No. 571,091

2 Claims. (Cl. 210—90)

This invention relates to what is believed to be a novel and improved debris accumulating and separating trap of a type which lends itself appropriately and satisfactorily useful and usable in a downspout leading from an eaves trough to a suitable drainage pipe.

Needless to say, and as implied by the introductory statement of the invention, I am aware that debris accumulator as well as separating traps are not broadly new. Keeping in mind the acknowledged state of development of the art to which the invention relates and seeking to promote the further progress thereof, I have devised an improved structural adaptation which is, in my opinion, destined to better fulfill the requirements of these types of traps.

Of rectangular box-like form and provided with a hinged cover for accessibility, the trap is interiorly improved by the adoption and use of an inclined separating screen, this interposed between the upper and lower downspout nipples and assuming a position to serve as a chute to not only separate the miscellaneous debris, but to shunt it into the accumulating compartment beneath the cover for easy removal.

Another phase of the invention has to do with the adoption and use of connecting nipples at corresponding points, the upper nipple having staggered baffles therein to minimize the possibility of clogging.

Another object is to provide a type of separator which is in the form of a reticulated basket or receptacle, this being slidably mounted on internal tracks, normally occupying a position in alignment with the baffle-equipped nipples, and then susceptible of movement to a position directly beneath the closing lid or door so that it can be lifted out, emptied and replaced.

Other features and advantages will become more readily apparent from the following description and the accompanying illustrative drawing.

In the drawing, wherein like numerals are employed to designate like parts throughout the views:

Figure 1 is a view partly in section and partly in elevation showing the eaves trough, downspout, and the improved debris intercepting and disposal trap mounted in the downspout.

Figure 2 is a top plan view of the trap per se.

Figure 3 is an end view thereof, that is, observing Figure 2 in the direction from right to left.

Figure 4 is a longitudinal sectional view, that is, a central longitudinal sectional view, through a modified type of trap.

Figure 5 is a transverse vertical sectional view taken approximately on the plane of the line 5—5 of Figure 4, looking in the direction of the arrows.

Reference being had first to Figure 1, it will be seen that the conventional eaves trough is denoted by the reference letter A, and this is connected to the adjacent upper section B of the downspout by way of a funnel-like joint C, the latter adapted to facilitate the entrance of leaves, sticks and other particles of debris into the downspout, the lower section of the downspout D connected to a drain or disposal pipe E. The improved trap is mounted in the downspout between the sections B and D and is denoted by the numeral 6.

The trap is in the form of a sheet metal or equivalent box of general rectangular form and has an inclined bottom 7 to facilitate drainage. The top is provided with an opening, and this is covered by a suitable lid or cover 8 hinged, as at 9. There is a neck-like nipple 10 at the bottom which telescopes into the downspout section D. This is provided on the interior with a dome-like filter 11 which fits, as at 12, into the nipple. This provides a very satisfactory type of screen for the final filtering step. The upper neck-like nipple is indicated at 13 and telescopes into the upper section of the downspout, this being provided with inclined and staggered baffles 14. On the interior of the box I provide accommodation lugs 15, 16 and 17, these to properly support the inclined removable separator screen 18. The screen is interposed between the two nipples and directly beneath the baffles and above the filter 11. Its inclination enables it to serve as a chute and it thus shunts the collected debris into the accumulating chamber 19 where it is removed by way of the door-closed opening. By thus locating the screen 18, it can be lifted up and out and any fine particles which accumulate in the lower compartment 20 can be readily cleaned out.

In the modification shown in Figure 4, the separator means is slightly different. That is to say, I prefer here to provide a suitably proportioned and shaped accumulating basket 21, this made of appropriate screen wire and having a supporting rim 22 at its top, said rim being slidable back and forth on the longitudinal hanger and track-forming flanges 23. Normally, the basket is beneath the baffle-equipped nipple to trap the leaves and other articles of debris. When it is desired to empty the basket, it is slid from the position seen in Figure 4 to the right, where it is then underneath the hinged door 8. It can be bodily removed, the contents dumped and then replaced in its regular trapping position.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. A debris accumulating and separating trap for drain pipes and down spouts comprising a receptacle including bottom, top, end and side walls, said top wall having an opening therein of sufficient size to permit access to be conveniently had to the interior of the receptacle, closure means for normally closing said opening, said top being further provided with means for attaching same in communication with an adjacent branch of the aforementioned down spout, the bottom wall of said box being provided with corresponding means aligned with the first named means and adapted for incorporation in the adjacent portion of said down spout, a strainer in said receptacle for coaction with said second named means, the vertical side walls of said box being provided on interior surfaces with guide and supporting members, an open top debris trapping basket located in said receptacle, said basket being normally in alignment with coacting portions of the down spout and being shiftable to positions out of alignment with said down spout and into alignment with the opening in the top wall to permit said basket to be removed for dumping of accumulated trash and debris, the open top of said basket being provided with means resting shiftably on said guide and supporting members.

2. A trap for incorporation in a downspout comprising a box-like receptacle of general rectangular form having an opening in its top permitting access to be had to the interior of said receptacle, a door for normally closing said opening, said top further having a baffle equipped nipple for attachment to the adjacent branch of the aforementioned downspout, the bottom of said box being provided with a similar depending nipple and the latter being in alignment with the first-named nipple and adapted for incorporation in said downspout, a strainer for coaction with said second nipple, the vertical side walls of said box being provided interiorly with longitudinally extending flanges forming supporting and guide tracks, a cylindrical open top debris trapping basket of a diameter considerably less than the internal area of said receptacle, said basket being adapted to be located between and in alignment with said nipples, or shifted to a position out of alignment with said nipples and in alignment with the opening in the top to permit said basket to be removed from the receptacle for dumping, the upper open top of said basket being provided with an outstanding marginal rim and said rim resting removably and slidably on said tracks.

ARMIE A. PINTO.

REFERENCES CITED

The following references are of record in the file of this patent:

UNITED STATES PATENTS

| Number | Name | Date |
|---|---|---|
| 1,356,368 | Jaynes | Oct. 19, 1920 |
| 571,776 | Long | Nov. 24, 1896 |
| 846,882 | Watson | Mar. 12, 1907 |
| 540,940 | Baughman | June 11, 1895 |
| 794,325 | Stout et al. | July 11, 1905 |
| 174,227 | Gill | Feb. 29, 1876 |
| 678,857 | Betzold | July 23, 1901 |
| 1,177,174 | Doty | Mar. 28, 1916 |
| 694,440 | Stair | Mar. 4, 1902 |
| 986,161 | French | Mar. 7, 1911 |
| 1,044,601 | Thiem | Nov. 19, 1912 |
| 1,337,595 | Cummings | Apr. 20, 1920 |
| 1,471,215 | Sigman | Oct. 16, 1923 |
| 381,990 | Driller | May 1, 1888 |
| 543,922 | Buckley | Aug. 6, 1895 |